Figure 1:
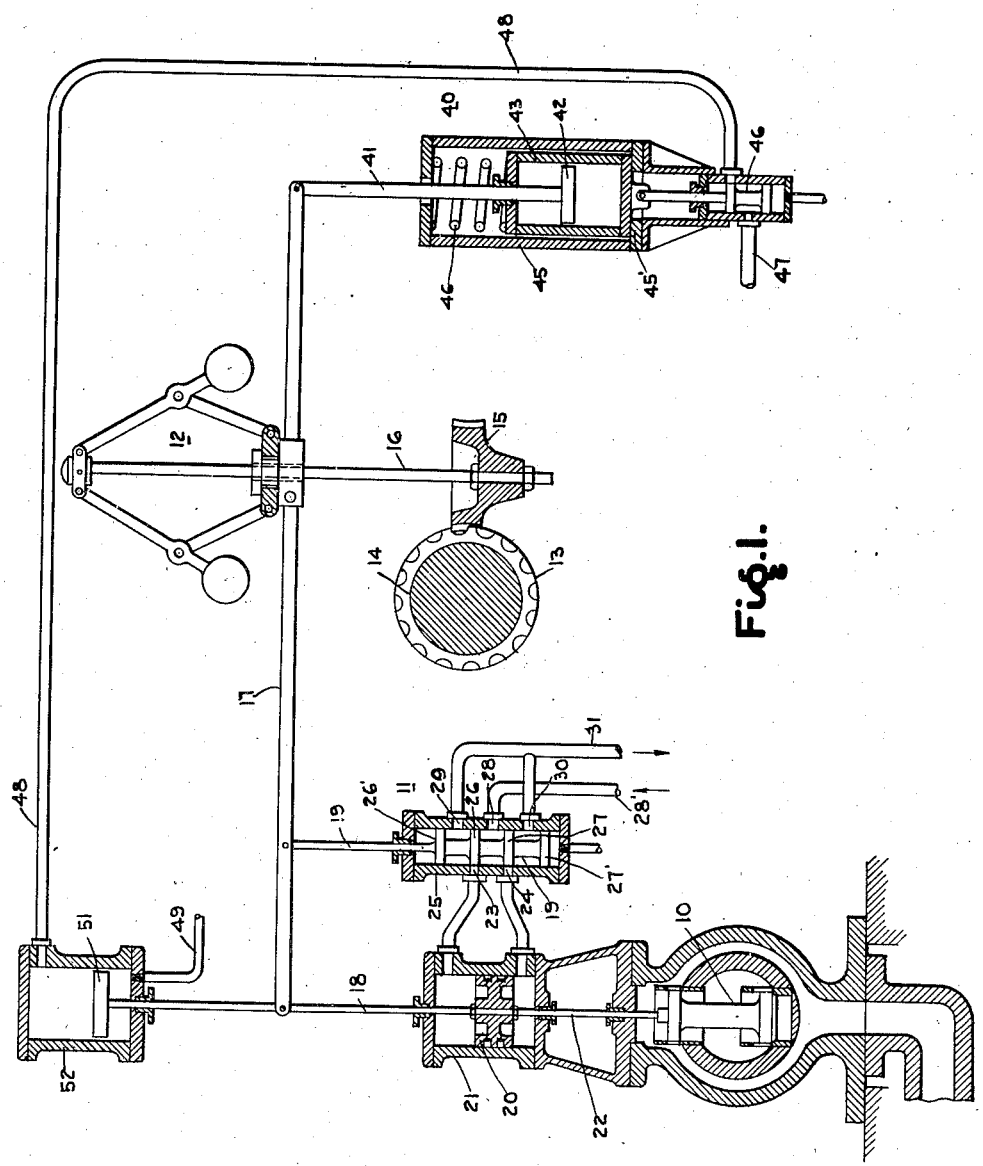

Oct. 7, 1930.     R. C. ALLEN     1,777,458
FLUID PRESSURE RELAY MECHANISM
Filed May 4, 1927     2 Sheets-Sheet 1

WITNESS
E. Lutz

INVENTOR
R.C.Allen
BY
a. B. Reaves
ATTORNEY

Patented Oct. 7, 1930

1,777,458

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

FLUID-PRESSURE RELAY MECHANISM

Application filed May 4, 1927. Serial No. 188,837.

My invention relates to a governing system, more particularly to a governing system for a prime mover, such as a steam turbine, embodying a fluid pressure relay mechanism, and it has for its object to provide a governing system of the character designated, which will shut off the supply of motive fluid promptly and rapidly upon a sudden and large increase in speed of the prime mover, such as caused by dropping of the load, or upon a sudden change in the operating condition in accordance with which the prime mover is governed.

In many of the early steam turbine governors the steam valve was controlled direct from the governor sleeve through a suitable linkage. As the capacities increased and the valve sizes increased, it became necessary to introduce a relay mechanism in order that the larger sizes of control valves might be controlled with sufficient accuracy to secure stable governing. The first and obvious motive fluid was steam. This was used for many years and finally given up, because of the difficulty experienced with the sticking of the steam piston and relay plungers. The tendency toward higher temperatures also made the use of steam undesirable. The present practice in large turbine work is to use oil under pressure to move the main valves, the oil acting on a hydraulic piston under the control of a balanced relay. The relay is controlled by a mechanism which is responsive to the operating condition in accordance with which the prime mover is governed. In the case of speed responsive governing, the governor may be of the centrifugal flyball type or of the fluid pressure type. If the prime mover is to be governed in accordance with pressure, such as the exhaust pressure of the prime mover, the relay is controlled by a pressure-responsive mechanism.

Recent experiences indicate that the action of the valves may desirably be made more rapid in most cases where the turbines are of the larger sizes. The area of the operating cylinders must be great in order to secure the necessary force to hold the valves in any required position with sufficient exactness. The large areas, on the other hand, require large volumes of oil to be pumped during the complete closing of the valves, which is required in the event of a machine losing its load. Recent practice indicates that large turbines must govern sufficiently well so that the entire load can be thrown off at one step, thus requiring very rapid action of the valves.

In accordance with my invention, I provide a governing system of any type embodying the usual fluid-pressure relay, and I also provide a mechanism for applying additional or auxiliary power to close the valves, the latter mechanism coming into operation only upon a sudden and large increase in speed of the steam turbine or other prime mover, due to dropping of its load or other cause, or upon a sudden change in pressure where the prime mover is controlled by pressure. I, preferably, use elastic fluid to motivate this mechanism in order to obtain a more rapid action thereof. The auxiliary power is desirably applied in response to control of the governor which normally controls the valves.

Figure 2:
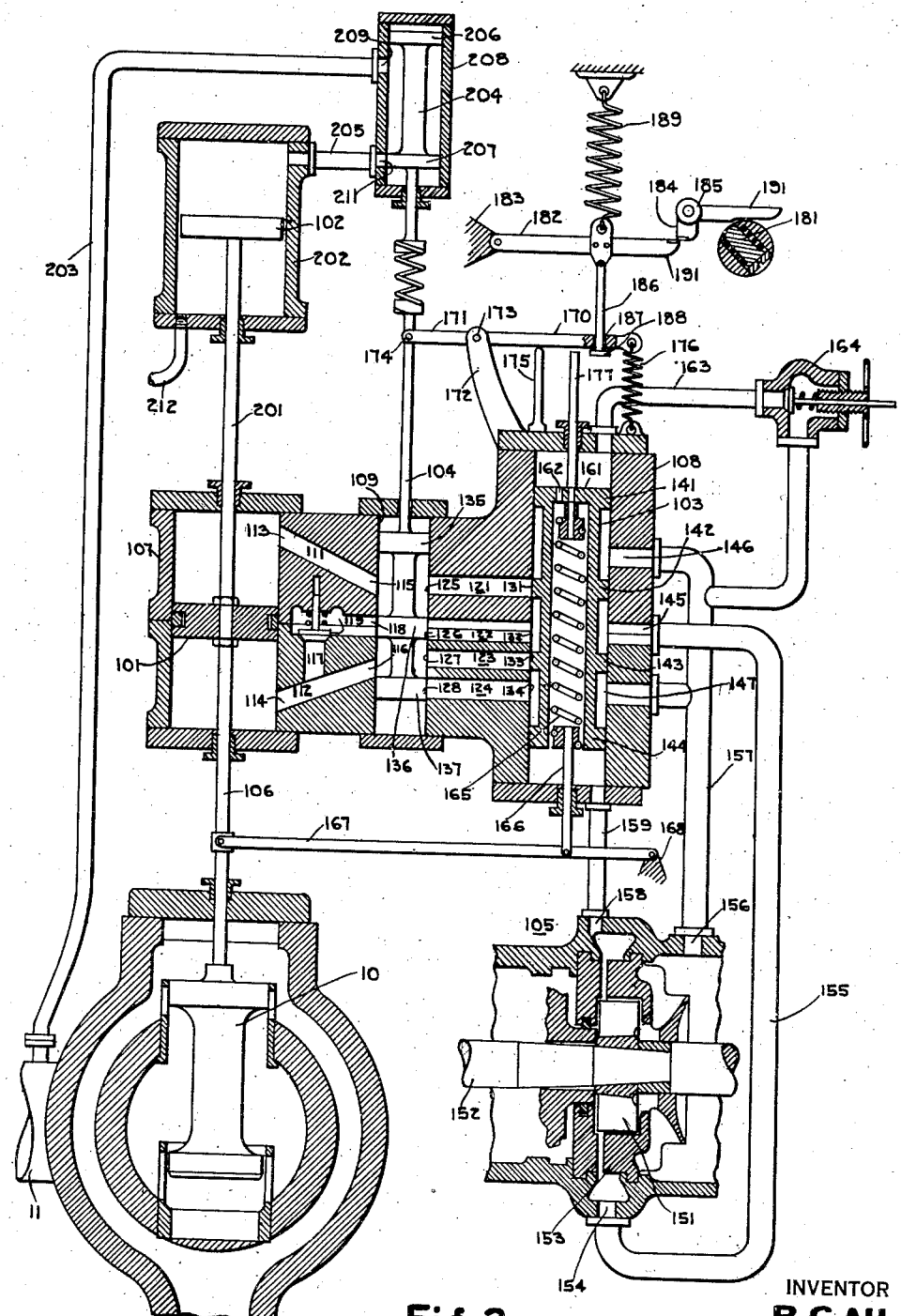

Apparatus exemplifying my invention is illustrated in the accompanying drawing, in which:

Fig. 1 is a diagrammatic view showing my invention in connection with a flyball governor; and, Fig. 2 is a similar diagrammatic view illustrating a modified embodiment in which the invention is applied to a fluid-pressure governor.

Referring to the drawing in detail, I have shown in Fig. 1 the admission valve 10 of a prime mover, for example, a steam turbine. It will be understood that, while I have shown but a single admission valve, a plurality of valves actuated by the same relay may be used instead of a single valve, the said valves being adapted to open and close simultaneously, or in sequence in any known manner. The valve is controlled through a fluid pressure relay 11 by a flyball governor 12. The governor 12 is driven from the turbine shaft, in this case being shown as driven by a worm 13, carried directly on the turbine shaft 14 and meshing with a gear 15 secured on the governor shaft 16.

The governor 12 is connected with the relay 11 by a floating lever 17, secured at one end to the rod 18 and intermediate its ends to the stem of a pilot valve 19. A power piston 20 reciprocates in a power cylinder 21, and is secured on the upper side to the rod 18 and on the lower side to the rod 22, the latter being operatively connected with the admission valve 10. The cylinder 21 communicates at its upper and lower ends with the ports 23 and 24, respectively, of the pilot valve casing 25. The pilot valve is provided with piston portions 26 and 27, which normally cover the ports 23 and 24, respectively. The casing 25 is also provided with a port 28 communicating with conduit 28', through which motive fluid is supplied for operating the relay. The casing 25 is further provided with ports 29 and 30, which communicate with a conduit 31, through which motive fluid may be discharged from the relay. The pilot valve 19 is further provided with shoulders or piston portions 26' and 27' of the ends thereof.

The apparatus so far described is of the well-known fluid pressure relay type.

The above described fluid pressure relay moves the valve or valves satisfactorily during normal variations in the speed of the prime mover. Upon a sudden increase in speed, however, such as when the prime mover has dropped its load, the rapidity of operaton of the relay is limited by the speed with which fluid pressure is supplied through the relay. In order, therefore, to make the closing action more rapid, I provide an auxiliary power piston 51, loosely fitted within an auxiliary power cylinder 52, and operatively connected with the valve 10, as by attachment to the upper end of the rod 18. I, preferably, use an elastic fluid, such as steam, to operate this piston, inasmuch as elastic fluid flows more rapidly than liquid, and, therefore, operates more rapidly to close the valve. The cylinder 52 communicates at its upper end with a conduit 48 through which elastic fluid is supplied to the cylinder, and at its lower end it communicates with conduit 49 through which the fluid leaking by the piston 51 may be discharged.

At the end of the lever 17, or at any point thereon near the governor 12, I connect a mechanism 40, which is responsive to abnormal increases in speed of the prime mover. This mechanism includes a stem 41 pivotally connected to the lever 17, and a piston 42 secured to the stem. The piston 42 disposed within a dashpot cylinder 43, the latter being adapted to slide vertically in a stationary supporting member 45. The cylinder 43 in normal position abuts at its lower end against a flange 45' of the stationary member 45, and a spring 46 exerts a downward force on the cylinder 43, normally holding it against the flange 45'. The piston 42 is loosely fitted within the cylinder 43, so that, during normal operation of the governor, when the piston 42 is moved slowly, the oil or other fluid in the cylinder 43 may pass around the piston 42. Upon a sudden increase in speed, however, the fluid does not pass as rapidly as the piston 42 rises, causing the cylinder 43 to rise with piston 42 against the force of the spring 46.

The cylinder 43 is connected to and operates a valve 46, controlling communication between the conduit 47 and the conduit 48. The conduit 47 leads to a source of motive fluid, preferably an elastic fluid such as steam.

The operation of the above described embodiment is as follows:

The governor 12, driven by the turbine shaft 14 through the worm 13 and gear 15, varies its vertical position in accordance with the speed of the turbine, rising higher as the speed increases. Upon an increase in speed, the governor 12 raises the lever 17, thereby raising the pilot valve 19. Motive fluid from conduit 28' then flows through ports 28 and 23 to the upper end of the cylinder 21 and acts on the power piston 20 to close the valve 10. The fluid in cylinder 21 below the piston 20 is discharged through ports 24 and 30 to the conduit 31. As the piston 20 moves downwardly, the pilot valve is moved downwardly by the lever 17 until it again closes ports 23 and 24.

Upon a decrease in speed, the governor 12 lowers the lever 17 and the pilot valve 19. This permits motive fluid to flow from the conduit 28' through ports 28 and 24 to the lower end of cylinder 21, and acts on the piston 20 to open the valve. The fluid above the piston 20 is discharged through ports 23 and 29 to the conduit 31. Upward movement of piston 20 continues until it brings the pilot valve back to normal position.

The operation above described controls the admission valve during normal variations in speed of the prime mover. During such normal variations the piston 42 moves slowly enough to permit the fluid in the cylinder 43 to pass the piston 42 without raising the cylinder 43.

Upon a sudden increase in speed of the prime mover, the fluid in cylinder 43 above the piston 42 cannot pass by the latter as rapidly as the piston 42 is moving, and consequently raises the cylinder 43 against the force of the spring 46. As the cylinder 43 rises, it opens the valve 46, permitting motive fluid to pass from conduit 47 to conduit 48, and to the upper end of cylinder 52, in which it acts upon the auxiliary power piston 51 to close the valve 10. In doing this, the main power piston 20 is moved downwardly and forces the fluid in the cylinder 21 below the piston 20 out through the discharge opening.

When the rapid motion has ceased, the spring 46 forces the cylinder 43 downward to the flange 45', bringing the valve 46 to closed position. The fluid above piston 51 in the cylinder 52 leaks by the piston 51 and escapes through discharge passage 49. The governor mechanism is now restored to normal condition and governs in the usual manner.

In Fig. 2, I show a modification of my invention in which a fluid pressure governor is employed. In this embodiment there is also provided means for by-passing fluid from one end to the other of the main power cylinder when actuating fluid is admitted to the auxiliary power cylinder.

Referring to the construction of this modification first, generally the valve 10 is connected to a main power piston 101 and an auxiliary power piston 102. The main power piston 101 is controlled by pilot valve 103 and also by supplemental pilot valve 104. The pilot valve 103 controls the piston 101 during normal operating conditions, while the supplemental pilot valve assumes control upon abnormal operating conditions. The pilot valve 103 is also the pressure responsive element of the fluid pressure governor, and is controlled by the variable fluid pressure developed by the apparatus designated generally by the numeral 105.

Referring now to the parts specifically, the valve 10 and the main power piston 101 are connected in any practical manner, as by a valve stem 106. The piston 101 operates in a main power cylinder 107, and the pilot valve 103 and the supplemental pilot valve 104 operate in cylindrical casings 108 and 109, respectively.

Passages 111 and 112 provide communication between the cylinder 107 and the casing 109, the ends thereof opening into the cylinder 107 being designated as ports 113 and 114, respectively, and the ends thereof opening into the casing 109 being designated as ports 115 and 116, respectively.

A passage 117 provides further communication between port 114 and the casing 109, the end thereof opening into casing 109 being designated as port 118, and being disposed near to port 115. A check valve 119 is provided in the passage 117, and permits flow of fluid from the port 114 to the port 118, but prevents flow in the opposite direction. The check valve is biased to closed position by a light spring, permitting the valve to open upon the pressure below the valve becoming slightly greater, for example, a difference in pressure of one-fourth pound per square inch.

Passages 121, 122, 123 and 124 provide communication between the supplemental pilot valve casing 109 and the pilot valve casing 108, the ends thereof opening into the casing 109 being designated as ports 125, 126, 127 and 128, respectively, and the ends thereof opening into the casing 108 being designated as ports 131, 132, 133 and 134, respectively.

The supplemental pilot valve 104 is provided with piston portions 135, 136 and 137. The piston portion 136 normally covers the ports 118 and 126, while the piston portion 137 normally covers the port 128. The piston portions 135 and 137 prevent the escape of fluid from the upper and lower ends, respectively, of the casing 109.

The pilot valve 103 is provided with piston portions 141, 142, 143, and 144, the piston portions 142 and 143 normally covering the ports 131 and 133. The casing 108 is provided with a port 145, through which fluid, preferably oil, for actuating the relay is supplied, and with ports 146 and 147 through which said fluid is discharged. The space between the piston portions 141 and 142 is in communication with the port 146 during the full travel of the pilot valve 103; the space between the piston portions 142 and 143 is in communication with the port 145; and the space between the piston portions 143 and 144 is in communication with the port 147.

The fluid-pressure developing apparatus 105, comprises an impeller 151, preferably carried directly on the rotor shaft 152 of the prime mover to be governed, and a casing 153, in which said impeller rotates. The casing 153 has a discharge opening 154 communicating with the port 145 of the pilot valve casing 108 through conduit 155, and an inlet opening 156 communicating with the ports 146 and 147 through conduit 157.

The casing 153 has a second discharge opening 158 communicating with the lower end of the pilot valve casing 108 through a conduit 159. The fluid pressure developed by the impeller 151, which varies as a function of the speed of the prime mover, is thus applied to the pilot valve 103 to urge it upwardly.

The pilot valve 103 is formed with a hollow interior, the lower end being open, and the upper end 161 being closed. The upper end 161 is provided with a restricted opening 162, through which a small amount of fluid from below the pilot valve is allowed to pass to the upper end of the pilot valve casing 108. A conduit 163 provides communication between said upper end of casing 108 and the discharge conduit 157, through which the fluid passing through the opening 162 may be discharged. An adjustable relief valve 164 is provided in the conduit 163, whereby a predetermined back pressure of any desired value may be imposed upon the fluid above the pilot valve 103, which pressure opposes the variable fluid pressure beneath the pilot valve.

A tension spring 165 is disposed within the hollow interior of the pilot valve 103, the upper end thereof being secured to the upper end 161 of the pilot valve, and the lower end being attached to the upper end of a stem 166, extending through the bottom wall of the casing 108. The lower end of stem 166 is pivotally secured to a lever 167 intermediate the ends thereof. The lever 167 is pivoted at one end to a stationary member 168 and at the other end to the valve stem 106.

The supplemental pilot valve 104 is actuated by a lever 171, to one end of which it is pivoted, as shown at 174. The lever 171 is fulcrumed intermediate its ends, as at 173, to a bracket 172, mounted on any stationary part, such as the casing 108. Downward movement of the right-hand arm 170 of lever 171 is limited by a stationary stop 175, and a spring 176 tends to hold the arm against the stop.

A stem 177, carried by the upper end 161 of the pilot valve 103, extends through the upper end wall of the casing 108 upwardly toward the lever 171. The upper end of the stem 177 is spaced from the lever 171 a distance equal to the upward travel of the pilot valve upon normal increases in speed, but is adapted to abut the arm 170 of the lever 171 and move it upon upward movement in excess of such normal travel.

The arm 170 is also adapted to be drawn upwardly upon operation of the auto-stop governor 181, which is usually set to operate at 10 to 15% overspeed. A lever 182 is fulcrumed to a stationary member at one end 183, and at its other end is held by one arm 184 of a bell-crank lever 185. A spring 189 exerts an upward force on the lever 182. A link 186 is suspended from the lever 182 and extends downwardly through an opening 187 in the arm of the lever 171. The link 186 has an abutment 188 at its lower end, whereby it draws the arm 170 upwardly upon upward movement of the lever 182. The link 186 is adapted to slide in the opening 187, however, upon upward movement of the arm 170 by the pilot valve 103 when the auto-stop governor does not operate.

The bell-crank lever 185 is operated by the auto-stop governor 181, which strikes the arm 191 of said lever when the predetermined overspeed is attained. The arm 184 is thus drawn out of contact with the lever 182, which then moves upwardly under force of the spring 189, which is stronger than the spring 176.

The auxiliary power piston 102 is operatively connected to the valve 10, being shown as attached to a piston rod 201, which is secured at its other end to the piston 101. The piston 102 is loosely fitted within a stationary auxiliary power cylinder 202. I prefer to operate the auxiliary power piston by steam, and therefore provide a conduit 203, communicating with the steam conduit 11. A valve 204 controls communication between conduit 203 and conduit 205 leading to the upper end of cylinder 202. The valve 204 has two piston portions 206 and 207, and operates in a valve casing 208, having two ports 209 and 211 communicating with the conduits 203, and 205, respectively, the port 211 being normally covered by the piston portion 207.

The valve 204 is connected to and operated by the lever 171. A spring is preferably interposed in this connection in order that possible sticking of the valve 204 will not prevent the supplemental pilot valve 104 from operating.

A leak-off conduit 212 provides communication between the lower end of the auxiliary power cylinder and the atmosphere.

The operation of this embodiment of my invention is as follows:

The impeller 151 develops a variable fluid pressure, which is communicated to the port 145 for actuating the power piston 101, and which is also communicated to the lower end of the casing 108 for actuating the pilot valve 103 in accordance with variations in the speed of the prime mover. This pressure is opposed by the back pressure above the pilot valve 103 and by the tension of the spring 165. When the prime mover is operating at constant speed after the admission valve 10 has been brought to the proper position, the piston portions of the pilot valve 103 cover the ports 131 and 133, and the piston portions of the supplemental pilot valve covers the ports 118, 126 and 128. The fluid within the main power cylinder 107 is thus "locked in", and the valve 10 is held stationary.

Assume now that the load on the prime mover decreases, causing an increase in speed thereof; such decrease, however, being only a normal variation in load and not amounting to the entire load. The increased fluid pressure developed by the impeller 151, as the result of the increased speed, raises the pilot valve 103 until the increased deflection of spring 165 increases the tension thereof to balance the increased pressure. Such deflection, however, does not exceed the clearance between the upper end of stem 177 and the arm 170 of the lever 171, and hence the supplemental pilot valve 104 and the valve 204 are not brought into operation.

The piston portions 142 and 143 now uncover the ports 131 and 133, which are placed in communication with the fluid-pressure supply port 145 and the discharge port 147, respectively. Fluid pressure is transmitted through passages 121 and 111 to the upper end of power cylinder 107, where it acts on the piston 101 to move the valve 10 in a closing direction. The fluid beneath the piston 101 is transmitted through passages 112 and 123, and ports 133 and 147, to the discharge conduit 157, through which it is returned to the impeller casing 153.

Upon downward movement of the piston 101 and the stem 106, the lever 167 is drawn downwardly, drawing the pilot valve 103 downwardly with it, through the link 166 and the spring 165, until the ports 131 and 133 are again covered, when movement of the piston 101 ceases.

Assume now that the load on the prime mover increases, resulting in a decreased speed thereof. The variable fluid-pressure below the pilot valve 103, decreased by the lower speed of the impeller 151, is now overcome by the back pressure above the pilot valve plus the tension of the spring 165. The pilot valve is therefore drawn downwardly until the decrease in tension of the spring equals the decrease in variable fluid pressure.

The port 133 is now placed in communication with the fluid pressure supply port 145, and the port 131 is placed in communication with discharge port 146. Fluid under pressure therefore flows through passages 123 and 112 to the lower end of main power cylinder 107, and raises the piston 101, causing an opening movement of the valve 10. The fluid in the cylinder above the piston 101 is forced out through passages 111 and 121 and ports 131 and 146 to discharge conduit 157. Upward movement of the valve stem 106 is imparted to the pilot valve 103, through the lever 167, the link 166 and the spring 165, until the ports 131 and 133 are again closed.

Assume now that the entire load on the prime mover is taken off, which may be caused by the opening of a circuit breaker where the prime mover is driving an electrical generator. The speed of the prime mover now accelerates at a much higher rate than during normal variations in load, and the fluid pressure developed by the impeller 151 is accordingly increased. The pilot valve 103 is subjected to the greatly increased pressure and is moved upwardly a greater distance, causing the stem 177 to strike the arm 170 of the lever 171.

The lever 171 operates the supplemental pilot valve 104 and the valve 204, moving them downwardly. The piston portion 207 of the valve 204 uncovers the port 211 and permits steam to flow through conduit 205 to the upper end of the auxiliary power cylinder 202. The steam moves the piston 102 downwardly with great force to close the admission valve 10.

The main power piston 101, by reason of its connection with the piston 102 and the valve 10, must be moved downwardly as the piston 102 moves the valve 10 to closed position. While the upper end of the cylinder 107 is in communication with the source of fluid pressure and the lower end is in communication with the discharge conduit as described above, the flow of fluid into and out of the cylinder 107 retards the movement of the piston 101, inasmuch as a liquid, preferably lubricating oil, is employed as the motive fluid, which does not flow as readily as elastic fluid.

The supplemental pilot valve 104 now occupies a position below its normal position. The piston portion 136 has uncovered the ports 118 and 126, and the piston portion 137 has uncovered the port 128.

The pressure of the fluid beneath the piston 101 is now greater than the pressure above the piston, due to the downward force transmitted from the piston 102. This pressure lifts the check valve 119, and a by-pass is thus established between the passages 112 and 111, through the passage 117 and the ports 118 and 115. The fluid in the lower end of the cylinder 107 is thus free to flow to the upper end thereof through a short path. The short path offers a minimum of resistance to the flow of the fluid, and the piston 101 is thereby permitted to move rapidly under force of the piston 102.

Should the auxiliary power piston fail to operate for any reason, such as sticking of the valve 204, the check valve 119 will prevent the escape of fluid pressure through the passage 117, and the fluid pressure from the relay 103 will flow through passages 121, 122 and 111 to the upper end of the cylinder 107 in substantially the same manner as during normal increase in speed.

As the valve stem 106 moves the valve 10 downwardly toward closed position, the pilot valve 103 is returned through the lever 167, the link 166 and the spring 165. The spring 176 draws the arm 170 of the lever 171 downwardly, bringing the valves 104 and 204 back to normal position. The apparatus is again in position to operate in the usual manner.

Assume again that the prime mover drops its load but that the pilot valve 103, for some reason, fails to act, or that it fails to act rapidly enough. The speed of the prime mover increases until the auto-stop governor 181 strikes the arm 191, releasing the lever 182. The latter, under the force of spring 189, raises the arm 170 of the lever 171, which operates the valves 104 and 204 as before, to close the admission valve 10.

As noted above, when the supplemental valve 104 is in its lower position, the ports 126 and 128 are uncovered, placing the passages 122 and 124 in communication with the passages 111 and 112, respectively. As the passages 122 and 124 are always in communication with the supply port 145 and the discharge port 147, respectively, a supply of fluid pressure to operate the piston 101 to close the admission valve 10 is always assured when the valve 104 is in lower position, even though the valves 103 and 204 both fail.

From the above description, it will be seen that I have provided a mechanism which is inoperative during normal variations in the speed of the prime mover but which acts rapidly to close the valve or valves upon a predetermined acceleration in speed. It will also be seen that inasmuch as elastic fluid is used to apply the auxiliary force, a rapid closing action is obtained. While the use of elastic fluids for operating admission valves has been known for some time, I believe it to be new to use oil or other liquid for normal operation of the valves, and elastic fluid for rapid closing.

While I have shown my invention in two forms, it will be obvious to those skilled in the art that it is not so limited, but is susceptible of various other changes and modifications, without departing from the spirit thereof, and I desire, therefore that only such limitations shall be placed thereupon as are imposed by the prior art or as are specifically set forth in the appended claims.

What I claim is:

1. The combination with a governor mechanism for a prime mover and a part moved thereby in a predetermined direction upon increases in speed, of auxiliary means controlled by the governor mechanism and effective when the speed of said prime mover accelerates above a predetermined rate of change in speed to assist the governor mechanism in moving said part in the predetermined direction.

2. The combination with a prime mover having a governor mechanism responsive to an operating condition of said prime mover and a part moved by said governor mechanism upon change in operating condition, of auxiliary means effective when the operating condition changes above a predetermined rate of change to assist the governor mechanism to move said part.

3. The combination with a prime mover having a governor mechanism responsive to an operating condition of said prime mover and a part moved by said governor mechanism upon change in operating condition, of auxiliary means controlled by the governor mechanism and effective when the operating condition changes above a predetermined rate of change to assist the governor mechanism to move said part.

4. The combination with a prime mover having a valve controlling the admission of motive fluid thereto, of mechanism for controlling the admission valve including a piston connected to and operating said admission valve, a pilot valve controlling the admission of motive fluid to said piston, a speed-responsive mechanism controlling said pilot valve, and means operable by the speed-responsive mechanism for applying additional force to close said admission valve upon abnormal increase in speed of said prime mover.

5. The combination with a prime mover having a valve controlling the admission of motive fluid thereto, of mechanism for controlling the admission valve including speed-responsive means, a fluid-pressure relay controlled by said speed-responsive means and operating said admission valve, and means for applying additional force to close said valve upon abnormal increase in speed.

6. The combination with a prime mover having a valve controlling the admission of motive fluid thereto, of mechanism for controlling the admission valve including a piston connected to and operating said admission valve, a pilot valve controlling the admission of motive fluid to said piston, a speed-responsive mechanism controlling said pilot valve, a second piston operatively connected to said admission valve, and means for applying motive fluid to said second piston upon abnormal increase in speed of said prime mover.

7. The combination with a prime mover having a valve controlling the admission of motive fluid thereto, of mechanism for controlling the admission valve including a piston connected to and operating said admission valve, a pilot valve controlling the admission of motive fluid to said piston, a speed-responsive mechanism controlling said pilot valve, a second piston operatively connected to said admission valve, and means for applying elastic motive fluid to said second piston upon abnormal increase in speed of said prime mover.

8. The combination with a part to be operated and a governor to control the operation of said part, of a liquid pressure relay operating said part and controlled by said governor, and an auxiliary relay motivated by elastic fluid and operatively connected to said part, and means for rendering said auxiliary relay operative in response to abnormal movement of said governor.

9. The combination with a prime mover having a valve controlling the admission of motive fluid thereto and a governor, of mechanism for operating the admission valve including piston means operatively connected to the valve, means controlled by the governor for supplying liquid pressure to the piston means, and other means for supplying elastic fluid pressure to the piston means.

10. The combination with a prime mover having a valve controlling the admission of motive fluid thereto and a speed-responsive means, of mechanism for operating the admission valve including piston means operatively connected to the admission valve, means controlled by the speed-responsive means for supplying liquid pressure to the piston means, and means controlled by the speed-responsive means for supplying elastic fluid pressure to the piston means upon abnormal change in speed of said prime mover.

11. The combination with a prime mover having a governor mechanism responsive to the speed of said prime mover and an admission valve moved by said governor mechanism upon change in speed, of auxiliary means controlled by the governor mechanism and effective when the speed increases above a predetermined rate of change in speed to assist the governor mechanism to close the admission valve.

12. The combination with a prime mover having a valve controlling the admission of motive fluid thereto, of mechanism for operating the admission valve including piston means operatively connected to the valve, means for supplying liquid pressure to the piston means in response to variations in the speed of the prime mover, and means for supplying elastic fluid pressure to the piston means in response to a predetermined rate of increase in the speed of the prime mover.

13. In a governing mechanism for a prime mover, the combination of a member movable in response to change in an operating condition of the prime mover, and means responsive to movement of said member at more than a predetermined rate of movement for shutting off the admission of motive fluid to the prime mover.

14. In a governing mechanism for a prime mover, the combination of a member movable in response to change in the speed of the prime mover, and means responsive to movement of said member at more than a predetermined rate of movement for shutting off the admission of motive fluid to the prime mover.

In testimony whereof, I have hereunto subscribed my name this 26th day of April, 1927.

ROBERT C. ALLEN.